United States Patent [19]
Soyad

[11] Patent Number: 5,928,698
[45] Date of Patent: Jul. 27, 1999

[54] METHOD OF MAKING A CARAMBOLA BEVERAGE

[76] Inventor: Tony T. Soyad, 29425 Geraldine, Warren, Mich. 48093

[21] Appl. No.: 09/052,633

[22] Filed: Mar. 31, 1998

[51] Int. Cl.$^6$ .................................. A23L 1/28; A23L 2/00
[52] U.S. Cl. ............................................ 426/489; 426/599
[58] Field of Search ...................................... 426/489, 599

[56] References Cited

PUBLICATIONS

Database Abstract (Dialog). WPI Acc No.: 97–236563/199722 for CN 1099234. Invenors: Dong et al, Mar. 1995.
Database Abstract. AN: 78(05):H0599 FSTA for Indian Food Packer, 31 (3) pp. 38–46, 1977.
Beverages, Time–Life Books/Alexandria Virginia, 1983.
Grolier Incorporated, The Encyclopedia Americana International Edition, 1994, p. 616.
Wendy B. Zomlefer, Guide to Flowering Plant Families, 1994, pp. 136–139.

*Primary Examiner*—Anthony J. Weier
*Attorney, Agent, or Firm*—Young & Basile, P.C.

[57] ABSTRACT

The present invention is a method for producing a liquid material which has as its major constituent edible nutritional components derived from fruit of the oxalidaceae family, particularly averrhoa carambola which includes the steps of extracting liquid constituents of carambola fruit from contact with solid constituents of the fruit and subjecting the separated juices to additional post extraction processes. The carambola fruit from which the liquid constituents are extracted includes central or edible fruit portions and surrounding tough rind-like outer skin material which is integrally attached to the edible fruit portions. The extraction procedure is generally accomplished by macerating a quantity of carambola fruit material in a mixing vessel for an interval sufficient to produce a slurry which contains the liquid constituents or juices as well as solid material derived from the carambola fruit which includes both the edible fruit solids and tough rind-like outer skin. The liquid constituents are then separated from the solid material and subjected to the additional post separation processing.

11 Claims, No Drawings

METHOD OF MAKING A CARAMBOLA BEVERAGE

FIELD OF THE INVENTION

The present invention pertains to methods for preparing carambola fruit, commonly referred to as star fruit. Specifically, the present invention pertains to methods for producing a potable beverage having as its major constituent liquid material derived from carambola. The present invention is also directed to the beverage having as its major constituent food material derived from carambola.

BACKGROUND OF THE INVENTION

Carambola, commonly known as star fruit, is a fruit produced from the carambola tree (Averrhoa carambola) a native of the East Indies. The carambola tree is a member of the oxalis family (Oxalidaceae) and bears small rose-purple flowers and smooth skinned, ridged, ovate fruit about 4 inches (10 cm) long. The fruit is characterized by a plurality of carinae which are positioned around and extend radially outward from the central body of the fruit defining a plurality of keel-like ridges. Carambola fruit is typically characterized by a five-angled loculicidal capsule. The common name "star fruit" comes from the characteristic shape of the fruit when cut crosswise. A cross section of the fruit reveals the inner fruit material which has a tough, apple-like consistency surrounded by a thick waxy rind-like skin integrally attached to the fruit material. Both the fruit material and the rind-like skin extend outward to form the characteristic star shape.

Worldwide acceptance of the star fruit as an edible and highly nutritious component in human diets has been slow. This is due, in part, to difficulties surrounding preparation of the fruit. The carambola tree itself has a limited growing region requiring tropical or at least subtropical climates. Additionally, the extraction of the fruit from the waxy tough rind-like skin has been difficult. Generally, the star fruit is sectioned and individual surfaces of the five-angled rind-like skin are removed by cutting or paring. This process is extremely time consuming and wasteful of nutritional fruit and flavoring components found proximate to the rind-like skin which is discarded with the parings. The fruit itself is generally eaten raw or is preserved or pickled.

Carambola, like other members of the oxalis family contain an acrid sap-like material composed of oxalic acid in the form of dissolved potassium oxalate. The sap is excreted as calcium oxalate and appears on plant parts as a colored viscous liquid or solid material. The sap acts as a protective device in nature to ward off foragers and the like. Heretofore, it has been believed that the rind-like section was inedible or, at the very least unpalatable. Without being bound to any theory, it is believed that this was due, in part, to the unpleasant granular feel of the rind upon chewing and to the presence of oxalic acid in the rind.

The difficulties in preparation and the heretofore limited growing region have relegated the carambola or star fruit to the role of decorative component in exotic seasonal dishes. However, the star fruit provides edible plant material which is high in nutrients and pleasant tasting. Additionally, if more convenient processing methods can be developed, the carambola could provide a substitute without the drawbacks found in more highly acidic fruits such as citrus fruits and the like; namely acid intolerance, etc.

Because of this, it would be desirable to provide a method for producing a food material which contains as its major component the edible portions of carambola; particularly the desirable juice component of the fruit. It would also be desirable to provide a method which permits the desired components of carambola to be easily removed or isolated from undesirable portions, ideally, in a manner which would permit the use of the nutritional portions of the fruit outside the growing regions for this plant. It is also desirable to provide additional methods for preserving the nutritional value of carambola beyond its typical growing season. Finally, it would be desirable to provide a potable beverage which contains as its major constituent juices derived from carambola or star fruit which would be both nutritious and provide a ready nutritional substitute for individuals desiring or requiring a different juice due to digestive intolerances or allergies experienced with other traditional fruit juices.

SUMMARY OF THE INVENTION

The present invention is a method for producing a liquid material which has as its major constituent edible nutritional components derived from Oxalidaceae Averrhoa; typically Averrhoa carambola and Averrhoa bilimbi. The method includes the steps of extracting liquid constituents of the fruit from contact with its solid constituents and subjecting the separated juices to additional post extraction processes. The Averrhoa fruit from which the liquid constituents are extracted has a central edible portion surrounded by a tough rind-like outer skin material integrally attached to the central edible portions.

The extraction procedure is preferably accomplished by macerating a quantity of the Averrhoa fruit having the central edible portion surrounded by at least a portion of the tough rind-like outer skin in a mixing vessel for an interval sufficient to produce a slurry which contains separated liquid constituents of the fruit as well as solid material derived from the Averrhoa fruit which includes both the central edible portion and tough rind-like outer skin. The liquid constituents of the fruit are allowed to remain in contact with the solid material for an interval sufficient to transfer any flavoring and nutritional components from the solid material into the liquid phase. The liquid constituents are, then, separated from the solid material and subjected to post separation processing.

DESCRIPTION OF THE PREFERRED EMBODIMENT

The present invention is predicated upon the unexpected discovery that separation of liquid constituents from fruit of plants of the oxalidaceae family, particularly those of the genus Averrhoa can be accomplished rapidly and efficiently to yield an edible liquid. More particularly, the present invention is predicated on the unexpected discovery that liquid separated from solid carambola fruit material can be separated in a process to provide an edible liquid of high nutritional value and excellent taste which does not possess the acrid taste generally associated with solid rind-like skin. The edible liquid thus produced is suitable for consumption as a beverage or use in various other food products as a flavoring agent.

Heretofore, it was widely held that the tough rind-like outer skin of the Averrhoa fruit such as carambola or bilimbi was both unpalatable and essentially inedible. Without being bound to any theory, it is believed that the presence of a naturally occurring material or materials in the rind can contribute to a slightly undesirable taste. Because of this, portions of the rind proximate to the ridges are routinely discarded to decrease the potential undesirable material prior to consuming the fruit center. It is believed that the undesirable material was a carboxylic or fatty acid or derivative thereof, with oxalic acid being most likely. Thus, where the fruit was prepared, it was routine for undesirable rind-like outer skin to be carefully removed and the mild tasting inner fruit material consumed. It has been found, quite unexpectedly, that, when the edible liquid is extracted from the intact carambola fruit, i.e., fruit having the inner edible portion and large amounts of the rind-like outer skin integrally attached thereto, that the resulting edible liquid or juice is characterized by a marked increase in flavor and quite possibly, nutritional value.

In the process of the present invention, the edible liquid or juice produced has as its major constituent, nutritional material which is derived from the fruit portion of plants of the averrhoa genus. In this process, fruit juice derived from carambola, commonly known as star fruit, is preferred. The edible liquid produced can subsequently be processed into potable beverages, employed as a flavoring agent, or subjected to other suitable post-processing steps to prolong its shelf life such as concentration, freezing, bottling or the like. Similarly, the edible liquid thus produced can be combined with water, other flavoring agents, such as alcohol beverage syrups or other juices to provide a carambola based beverage of differing flavors. It is anticipated that the edible liquid or juice produced by the present invention can be subjected to concentration procedures and/or freezing and bottling processes in a manner similar to processing of citrus juices such as orange juice.

The method for producing edible liquid having as its major constituent nutritional material derived from carambola generally comprises a step in which liquid constituents of the carambola fruit are extracted from contact with its solid constituents of the intact fruit. In the method of the present invention, the solid constituents of the intact fruit comprise both the edible interior portion of the carambola fruit and the tough rind-like outer skin integrally attached to the edible portion to surround and protect it. The extracted liquid constituents of carambola fruit can then be subjected to additional post extraction processes. Heretofore, it was believed that the tough rind-like outer skin was composed of a poor tasting, at least partially indigestible material which if not removed prior to human consumption would compromise the palatability of the edible interior portion by imparting undesired flavor and poor mouth feel to the fruit portion. Thus, great care is generally taken to separate at least major portions of the tough rind-like outer skin from the inner edible portion prior to consumption or use.

It has been found, quite unexpectedly, that processing the carambola fruit in a manner which extracts the liquid constituents from the intact fruit, i.e. both the edible interior portion and the tough rind-like outer skin integrally attached thereto, actually imparts subtle flavor enhancements to the resulting edible liquid. This is contrary to the expected acrid taste which was predicted for liquid processed in the presence of the rind portion. Without being bound to any theory, it is believed that the tough, rind-like outer skin contains flavor-enhancing compounds if not actual nutritional components which, are extracted along with the liquid constituents of the edible central portion yielding the edible liquid described herein. Without being bound to any theory, it is further believed the flavoring components contained in the rind portion undergo an infusion-like process into the edible liquid during suitable extraction procedures. This may be due to the interaction of liquid constituents liberated from the edible central portion actually acting upon the cellulosic material of the outer skin to extract or liberate the flavor enhancing agents. The result, regardless of theoretic mechanism, is a carambola fruit liquid which has a distinctive flavor and character superior to carambola fruit liquid derived from fruit in which the tough rind-like outer skin has been removed.

It is to be appreciated that carambola fruit, with its plurality of longitudinally projecting keel-like petals is both difficult and complex to accomplish rind removal. Preliminary removal of the tough rind-like outer skin prior to extraction of liquid constituents would be both time-consuming and wasteful. Significant portions of the edible central material proximate to the tough rind-like outer skin would necessarily be removed in the skinning process. Additionally, the carambola fruit, typically has a plurality of seeds disposed around and proximate to the central axis of the fruit. The position of the seeds makes the necessary seed removal extremely difficult and wasteful when conventional processes are employed. Thus, a process in which the desired liquid constituents of carambola fruit can be isolated without requiring the removal of the heretofore undesirable skin is both advantageous and, quite possibly necessary if the edible carambola liquid is to be successfully utilized.

In the preferred embodiment, the extraction of liquid constituents from the carambola fruit is accomplished by macerating suitable quantities of whole carambola fruit in an appropriate mixing vessel. As used herein, the term "macerating" is defined as a mechanical process wherein a solid material is exposed to agitation with concomitant shredding and pulverization while contained in a suitable mixing vessel. In the present invention, carambola fruit is subjected to agitation and the shredding action and interaction of various blade like surfaces in an appropriate mixing vessel resulting in the liberation of liquid from the cellulosic fruit material in which it is contained. As a result of the agitation process, the resulting material is a readily separable fluid-like slurry which comprises the newly liberated liquid constituents of the carambola fruit as well as solid shredded material derived both from the central edible portions and tough rind-like outer skin as well as fruit seeds.

Maceration proceeds for an interval sufficient to shred and reduce the particle size solid material, i.e., the tough rind-like outer skin and edible central fruit portions. The resulting solid material has a granular consistency with the concomitant liberation of liquid from the solid material. Depending upon the speed of agitation, the quantity of the carambola fruit processed and the like, maceration can proceed for an interval between about one second and about five minutes with intervals between about five seconds and about one minute being preferred.

The process of the present invention permits the maceration of whole carambola fruit. Whole carambola fruit which has been subjected to appropriate preprocessing procedures such as cleaning, sorting and the like are placed directly in the mixing vessel for maceration without prior removal of outer skin or the like. It is also within the purview of this invention, that minor portions of the rind-like outer skin can be removed prior to maceration. Where performed, the outermost regions of the carinae, (the tips of the stars) can be removed by appropriate longitudinal slicing procedures. It has been found that removal of the outermost projections of the carinae prior to maceration minimizes the amount of waste slurry material which must ultimately be handled and disposed of. It has been found that this slicing does not unduly compromise the ultimate taste of the edible liquid thus produced. The amount of rind-like outer skin which remains after removal of the tips from the carinae is sufficient to impart the unique flavor to the edible liquid thus produced.

Once maceration has been completed, the desired liquid constituents are separated from the solid shredded material. This can be accomplished by a variety of processes including, but not limited to, settling, sieving and the like. In the preferred embodiment, the resulting slurry is passed through a suitable sieve which retains the solid constituents while permitting the liquid constituents to pass through for collection. To enhance the sieving process, the slurry material can be subjected to suitable compression steps to increase liquid removal. It is also within the purview of this invention that the macerated material can be subjected to multiple sieving processes to speed the actual separation of the edible liquid. Alternately, the separation can be accomplished by processes which include settlement and decanting of the liquid constituents or separation processes which include combinations of the procedures previously mentioned.

The solid material which is retained is characterized by a pulpy material believed to be primarily made up of edible central portion solids and a granular material believed to be derived from the tough outer rind-like skin. It has been found, quite unexpectedly, that the amount of undesired solid material which passes with the liquid is surprisingly small. This is particularly true for the solid granular material derived from the tough rind-like outer skin. Without being bound to any theory, it is believed that the granular solids derived from the tough rind-like outer skin are held back during the sieving process by the more amorphous solids derived from the edible fruit portion. The separated liquid constituent is surprisingly free of gritty solids which adversely affect mouth feel and enjoyment of the liquid.

The resulting liquid which is collected is generally a yellowish golden opaque liquid having a mildly tart flavor akin to citric materials such as orange juice.

The resulting liquid material can be subjected to suitable post-separation processes. This can include removal of water through appropriate concentration and distillation processes. Additionally, the resulting juice can be admixed with water, suitable flavoring agents such as sugar and the like to produce a potable beverage. It is also within the purview of this invention that the resulting juice can be collected and bottled to be consumed directly as a fruit juice. It is also within the purview of this invention that the fruit juice can be employed as a flavoring agent or an admixture with other fruit juices. Having thus described the preferred embodiment of the present invention, attention is directed to the following examples. The examples are to be construed as illustrative of the present invention and not limitative thereto.

EXAMPLE I

Five 10 inch carambola star fruit are washed and placed sequentially in a standard Cuissinart brand food processing unit. The unit is operated at a medium processing speed for a total of two minutes. After that time, the processing is discontinued.

The resulting material is a liquid slurry having a light orange color. The slurry is decanted into a sieve which retains solid pulp-like material. An opaque orange liquid is collected in an appropriate container.

To further increase the amount of liquid collected, the pulp-like material is pressed and opaque liquid is collected in a second container. A sample of each liquid was tested. The liquids both exhibited a tangy citrus-like taste. The two amounts were combined for further analysis.

EXAMPLE II

Pulp collected in the process of Example I is included in the food processing unit and additional carambola fruit is added and processed in the manner outlined in Example I. The resulting opaque orange liquid is collected for further processing and analysis.

EXAMPLE III

A portion of the liquid collected in Example II is concentrated by a suitable evaporative process. The volume of the concentrated material is reduced to one third of the original volume. This material is placed in appropriate container and stored in a freezer unit for 1, 3 and 6 months respectively, after which the material is thawed and reconstituted to its original volume. Taste tests indicate no appreciable difference in taste or quality, thus indicating that the carambola liquid is capable of concentration and prolonged freezer storage.

EXAMPLE IV

A portion of liquid produced in the manner outlined in Example II is given to individuals who report gastric discomfort upon ingestion of citrus juice such as orange juice or grapefruit juice. Quantities of carambola juice equal to the amount of citrus juice causing gastric discomfort are administered. The individuals report minimal or no gastric discomfort.

EXAMPLE V

Samples of juice produced by the process outlined in Example I are given to a series of individuals in a side-by-side comparison with orange juice. The individuals surveyed report that the carambola juice is more tangy, less bitter and more refreshing.

EXAMPLE VI

A variation on straight carambola fruit juice is prepared. Carambola juice prepared by the process outlined in Example I is collected and admixed with sugar in proportions of 1, 2, 3, 4, 5 and 6 teaspoons per 12 ounces of carambola juice. The sugar readily dissolves and the resulting material is a juice having varying degrees of sweetness which various individuals found pleasant and beneficial.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for producing an edible liquid having as its major constituent nutritional material derived from fruit of averrhoa plants, the method having steps consisting essentially of:

separating liquid constituents of the averrhoa fruit from contact with solid constituents of the averrhoa fruit, said solid constituents of the averrhoa fruit comprising edible fruit portions and tough rind-like outer skin integrally attached to the edible fruit portion, said separation step consisting essentially of:

a) macerating a quantity of averrhoa fruit comprising said edible fruit portions and said tough rind-like outer skin integrally attached thereto in a mixing vessel for an interval sufficient to form a slurry comprising said liquid constituents of edible fruit portions and solid granular and shredded material derived from said edible fruit portions and said tough rind-like outer skin; and b) separating said liquid constituents from said solid granular and shredded material; and subjecting said separated liquid constituents to additional post-extraction processes.

2. The method of claim 1 wherein said averrhoa fruit to be macerated has a portion of said rind-like outer skin removed said portion of rind-like outer skin removed from the averrhoa fruit located longitudinally along outermost tips of each circumferential projection of said fruit.

3. The method of claim 2 wherein the averrhoa fruit used in the maceration step is introduced as substantially whole units into said mixing vessel.

4. The method of claim 1 wherein said post separation processes comprises:

collecting separated juice in a suitable storage receptacle; and admixing said collected juice with a portion of sweetener and water to produce a dilute sweetened fruit beverage.

5. A method for producing an edible liquid having as its major constituent nutritional material derived from fruit of averrhoa plants, the method having steps consisting essentially of:

separating liquid constituents of the averrhoa fruit from contact with solid constituents of the averrhoa fruit, said solid constituents comprising edible fruit portions and tough rind-like outer skin integrally attached to the edible fruit portion, said separation step consisting essentially of:

a) macerating a quantity of averrhoa fruit comprising said edible fruit portions and said tough rind-like outer skin integrally attached thereto in a mixing vessel for an interval sufficient to form a slurry, said slurry comprising constituents of edible fruit portions and solid granular and shredded material derived from said edible fruit portions and said tough rind-like outer skin; and b) separating said liquid constituents from said solid granular and shredded material, wherein said solid granular and shredded material comprises fruit pulp and granular fruit skin and wherein said separation step is accomplished by straining said liquid constituents and solid constituents through a sieve; and subjecting said separated liquid constituents to post-separation processes, said post-separation processes comprising:

a) collecting separated juice in a suitable storage receptacle; and b) admixing said collected juice with sufficient sweetener and water to produce a dilute sweetened fruit beverage.

6. The method of claim 5 wherein a portion of said fruit pulp is retained with said strained separated liquid.

7. A method for producing a fruit beverage consisting essentially of the steps of:

macerating a quantity of unprocessed carambola fruit in a mixing vessel, said carambola fruit having an inner fruit pulp and a thick tough outer rind-like material, said thick tough outer ring-like material surrounding said fruit pulp and integrally connected thereto and said inner fruit pulp having juice contained therein, said macerating step occurring for an interval sufficient to produce a slurry containing said inner fruit pulp, said tough outer rind-like material, and juices derived from said fruit pulp and said thick outer rind-like material, said inner fruit pulp and said thick outer rind-like material being present in said slurry as granular material;

maintaining said juices in contact with said fruit pulp and granular thick outer rind-like material for an interval sufficient to allow said thick outer rind-like material to interact with components present in said juices;

separating said granular thick outer rind-like material and at least a portion of said fruit pulp from contact with said juices; and collecting said juices in a suitable collection vessel.

8. The method of claim 7 wherein said quantity of carambola fruit used in the maceration step has at least a portion of said thick outer rind-like material removed proximate to the outermost longitudinal projections of said carambola fruit sufficient to expose a portion of said inner fruit pulp.

9. The method of claim 8 wherein the whole carambola fruit used in the maleration step is cut into sections which can be accommodated into said mixing vessel.

10. The method of claim 7 wherein at least a portion of said separated granular thick outer rind-like material and said fruit pulp is retained apart from said juice and said carambola used in the macerating step retained separated granular thick outer rind-like material admixed with the carambola fruit.

11. The method of claim 1 further comprising subjecting said separated liquid constituents to additional post-extraction processes reducing water content of said separated liquid constituents.

* * * * *